July 22, 1958     F. B. CROWLEY     2,844,288
HOUSEHOLD ROASTERS
Filed Sept. 17, 1954
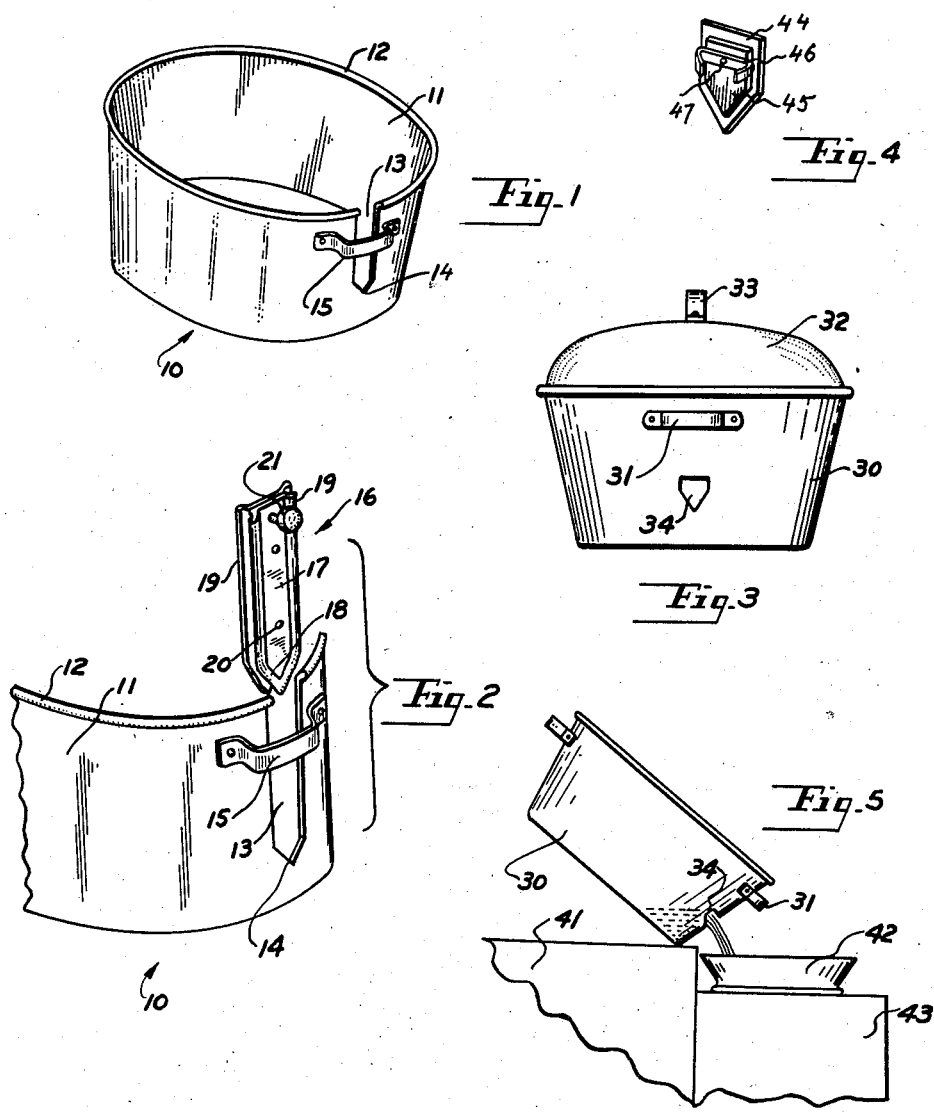
INVENTOR.
FRANCIS B. CROWLEY.
BY Louis Chayka
ATTORNEY

United States Patent Office 2,844,288
Patented July 22, 1958

2,844,288

HOUSEHOLD ROASTERS

Francis B. Crowley, Detroit, Mich.

Application September 17, 1954, Serial No. 456,681

3 Claims. (Cl. 222—466)

My improvement pertains to roasters used primarily for the purpose of roasting meats. When meat is prepared for eating by being cooked in a roaster, natural juices and fatty substances, sometimes called meat brownings or drippings, emanating from the meat and/or its dressing accumulate in the bottom portion of the roaster. After the meat is completely roasted and removed from the roaster, these meat brownings or drippings are used in preparing gravy.

Gravy is normally prepared by placing the roaster, with the brownings or drippings in the bottom thereof, but with the meat removed, over a hot burner and by adding to the brownings or drippings ingredients, such as water, milk, flour, and desirable seasonings, and mixing same by stirring while being heated.

To remove the gravy from the roaster is a not too easy and sometimes dangerous task. The removal of the gravy is accomplished by using both hands, one on the handle at each end of the roaster, and by tilting the roaster to an ultimate angle 90° from the horizontal. It is therefore, most difficult to remove all of the gravy from the roaster. Because both the gravy and the roaster are hot and steam generally emanates from the hot gravy, the hands and arms are sometimes burned by coming in contact with the hot gravy, the hot pan, or steam.

It is the object of my improvement to provide means whereby said gravy may be drained off easily and safely. The gravy may be drained off by the use of one hand only—applied to the roaster handle at the end of the roaster remote from that which is provided with an aperture therein. The roaster need not be tilted to an angle 90° from the horizontal. The free hand may be used to scrape the pan so that all of the gravy may be easily removed. For the reason that but one hand is used in tilting the roaster, and because the roaster need be tilted but slightly, all of the clumsiness and all the danger of hand and arm burns are removed.

The improvement consists in having the wall of the roaster provided with an outlet at a level close to the bottom thereof, the outlet being provided with a suitable closure which may be removed when the liquid contents of the roaster are to be drained.

I shall now describe the improvement with reference to the accompanying drawings in which:

Fig. 1 is a perspective view of a roaster including my improvement;

Fig. 2 is an enlarged perspective view of that portion of the roaster which includes my improvement, the view including a perspective view of a sliding closure in a position out of engagement with the wall of the roaster;

Fig. 3 is an end view of a modified roaster provided with an outlet in its wall;

Fig. 4 is an enlarged perspective view of a closure adapted to be used in conjunction with the outlet mentioned in the description of Fig. 3;

Fig. 5 is a side elevational view of a roaster in its tilted position endwise for the purpose of pouring off the liquids therein.

Similar numerals refer to similar parts throughout the several views.

The roaster shown in Fig. 1 and generally identified by numeral 10 illustrates the class of cooking vessels to which my improvement pertains. The roaster includes a vertical wall 11 terminating at the top with a curled rim 12. At one end of said roaster its wall opens from the top into a narrow, vertical slot 13. The opposed edges of the slot, which, if desired, may be also curled, converge at the lower end of the slot, as shown at 14, till they meet at a level spaced upwardly from the bottom of said roaster.

Secured to the wall of the roaster, at the slotted end, is a handle 15 which is disposed crosswise with respect to said slot and which serves both as a means of lifting the roaster and as a means of reinforcing the wall at its slotted portion. A similar handle is mounted on the wall of the roaster at its opposite end and at the same level.

Adapted to fit into the slot, so as to close it, is a sliding member generally identified by numeral 16. It consists of two metal strips 17, each having a tapered lower portion 18.

The strips are secured to each other by rivets 20, by spot welding, or by any other suitable means, but the marginal portions of the strips are spread apart so as to straddle the edges of the slot 13. A knob 21, at the top portion of said member 16, serves for manual operation thereof in fitting it into the slotted portions of the wall 11 or in removing said member 16 therefrom.

The draining-off aperture 34 in the roaster shown in Fig. 3 is of a different shape, being confined to the lower portion of the wall 30 of the roaster without being extended by slot means to the upper rim thereof. The roaster is provided with handles 31, of which only one is shown, and with a cover 32 including a handle 33.

A closure for the opening 34, enlarged for a better view thereof, is shown in Fig. 4. It comprises a plate 44 having its mid-portions 45 dished in and of a size and form corresponding to the size and form of said opening 34, with the object of having said mid-portion fit into the opening. A leaf spring 46, secured to said mid-portion 45 by a pin 47, serves to keep the closure in place. The outwardly-bent ends of the spring, when once thrust into the interior of the vessel, on the application of the closure to the opening 34 will act as anchoring means for the closure, but will yield to pressure exerted thereon in the course of the removal of the closure outwardly. This may be done by means of a small knob which is not shown but which may be mounted on the outer surface of said mid-portion 45.

The manner in which the vessel disclosed in Fig. 3 is to be tilted endwise for the purpose of pouring off the liquid therein is shown in Fig. 5 wherein numeral 42 indicates a dish into which the liquid may be drained.

It will be understood that the inventive concept disclosed herein will be equally applicable to roasters equipped with electric heating means forming a part thereof.

It will be further understood that some changes may be made in the structure of the vessels shown by me, but that such changes may still be made within the compass of my inventive concept.

What I, therefore, wish to claim is as follows:

1. A roaster open at the top, the roaster having a horizontally-disposed bottom and an upwardly-rising wall, the wall being provided with a slot extending from the upper rim of the wall downwardly to a level spaced from said bottom to form a pouring outlet, and a plurality of handle means for lifting of said roaster, one of said handle means being secured to the wall across the slot at a level above the lowest point of said slot.

2. A food-cooking roaster open at the top, the roaster having a horizontally-disposed bottom and an upright wall rising therefrom, the wall being provided with a slot forming a pouring outlet, the slot extending from the upper rim of the wall downwardly, the lower end of the slot terminating at a level above the level of the bottom, and a removable closure for said slot.

3. A roaster open at the top, the roaster having a horizontally-disposed bottom and an upright wall rising therefrom, the wall being provided with a vertical slot forming a pouring outlet for liquid contents of the roaster, said slot extending from the upper rim of the wall downwardly to a level above that of the bottom, while the portion of the wall below said slot remains solid, a removable closure for said slot, and a plurality of handles secured to the outer surface of the wall adjoining the upper rim of the roaster and projecting outwardly from said wall for easy manual grasp, one of the handles extending across the slot at a level above the lower end thereof.

References Cited in the file of this patent
UNITED STATES PATENTS

| | | |
|---|---|---|
| 268,313 | Stokes et al. | Nov. 28, 1882 |
| 435,465 | Taylor | Sept. 2, 1890 |
| 578,765 | O'Callaghan | Nov. 16, 1897 |
| 960,492 | Brinser | June 7, 1910 |
| 990,161 | Paiste | Apr. 18, 1911 |
| 1,384,786 | Thompson | July 19, 1921 |
| 2,293,476 | Suellings | Aug. 18, 1942 |
| 2,574,295 | Schoon | Nov. 6, 1951 |